(12) United States Patent
Fuchs

(10) Patent No.: US 8,397,392 B2
(45) Date of Patent: Mar. 19, 2013

(54) MARKING AND/OR LEVELING DEVICE

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 12/739,152

(22) PCT Filed: Oct. 17, 2008

(86) PCT No.: PCT/EP2008/064038
§ 371 (c)(1),
(2), (4) Date: Oct. 26, 2010

(87) PCT Pub. No.: WO2009/053314
PCT Pub. Date: Apr. 30, 2009

(65) Prior Publication Data
US 2011/0030230 A1  Feb. 10, 2011

(30) Foreign Application Priority Data
Oct. 22, 2007  (DE) .......................... 10 2007 050 292

(51) Int. Cl.
*G01C 15/00* (2006.01)

(52) U.S. Cl. .................. 33/291; 33/283; 33/DIG. 21

(58) Field of Classification Search .................... 33/291, 33/227, 286, DIG. 21, DIG. 1
See application file for complete search history.

(56) References Cited

U.S. PATENT DOCUMENTS

| | | | |
|---|---|---|---|
| 3,863,357 A * | 2/1975 | Knapp et al. ..................... 33/324 |
| 5,459,932 A | 10/1995 | Rando et al. |
| 6,625,895 B2 * | 9/2003 | Tacklind et al. ................ 33/286 |
| 6,792,685 B1 * | 9/2004 | Ng et al. ......................... 33/286 |
| 6,922,063 B2 * | 7/2005 | Heger ............................. 33/291 |
| 7,121,012 B2 * | 10/2006 | Voecks ........................... 33/345 |
| 7,395,605 B2 * | 7/2008 | Voecks ........................... 33/345 |
| 7,493,701 B2 * | 2/2009 | Chen .............................. 33/291 |
| 7,591,075 B2 * | 9/2009 | McCracken .................... 33/291 |
| 7,752,764 B2 * | 7/2010 | Silvers et al. .............. 33/366.24 |
| 7,845,087 B2 * | 12/2010 | Voecks ........................... 33/391 |
| 7,954,248 B2 * | 6/2011 | Kallabis et al. ................ 33/286 |
| 2003/0101605 A1 | 6/2003 | Tacklind et al. ................ 33/286 |
| 2006/0080849 A1 | 4/2006 | McCarty |
| 2007/0227017 A1 * | 10/2007 | Milligan et al. ............... 33/228 |
| 2008/0078091 A1 * | 4/2008 | McCracken .................... 33/291 |
| 2008/0209745 A1 * | 9/2008 | Tamamura ..................... 33/286 |
| 2008/0271329 A1 * | 11/2008 | Voecks ........................... 33/345 |
| 2009/0113731 A1 * | 5/2009 | Kallabis et al. ................ 33/227 |
| 2011/0030230 A1 * | 2/2011 | Fuchs ............................. 33/283 |

FOREIGN PATENT DOCUMENTS

| DE | 297 16 316 | 1/1998 |
|---|---|---|
| EP | 0 341 812 | 11/1989 |
| WO | WO 99/54681 | 10/1999 |

* cited by examiner

*Primary Examiner* — Yaritza Guadalupe-McCall
(74) *Attorney, Agent, or Firm* — Merchant & Gould P.C.

(57) ABSTRACT

The invention relates to a marking and/or leveling device (1) comprising a light source (4) disposed on a pendulum (3) that can pivot relative to a housing (2). According to the invention, means are provided for accelerating (9) the pendulum (3) and/or a pendulum bearing (8) in a pulsing manner.

10 Claims, 1 Drawing Sheet

MARKING AND/OR LEVELING DEVICE

This application is a National Stage Application of PCT/EP2008/064038, filed 17 Oct. 2008, which claims benefit of Ser. No. 10 2007 050 292.5, filed 22 Oct. 2007 in Germany and which applications are incorporated herein by reference. To the extent appropriate, a claim of priority is made to each of the above disclosed applications.

TECHNICAL FIELD

Marking and/or leveling devices with differently configured pendulum systems for the vertical or horizontal alignment of a light source are known. In a first known embodiment, the pendulum carrying the light source is configured as a thread or a cord. A disadvantage of this pendulum system is that it is extremely sensitive to jarring and is difficult to stabilize, respectively level off. A second known embodiment of a pendulum system comprises a rigid pendulum, which is mounted on an edge or tip. The sensitivity of said pendulum system to shock is a disadvantage. In a third known embodiment, the pendulum system comprises a rigid pendulum, which is mounted in the manner of a universal joint (cardan joint). A disadvantage of this intrinsically robust pendulum system is the complex and cost intensive manufacture of the universal joint, which has to work almost frictionlessly.

In addition, a disadvantage with all known pendulum laser systems is that they comparatively high in design and as a rule require a separate pendulum damping in order to avoid a very long stabilization process.

SUMMARY

Technical Aim

The aim of the invention is to provide a marking and/or leveling device with an alternately embodied pendulum system, which on the one hand can be low in design and in which on the other hand the stabilization period is as short as possible.

Technical Solution

This aim is met by a marking and/or leveling device. All combinations of at least two of the characteristics disclosed in the description, the claims and/or the figures fall within the scope of the invention.

The idea underlying the invention is to associate means for accelerating, respectively moving, the pendulum in a pulsing manner with the pendulum, which carries the light source, particularly configured as a laser light source, and with which the light source can pivot relative to the housing of the marking and/or leveling device in at least one, preferably in all of the spatial directions and can thereby be perpendicularly aligned. Additionally or alternatively, it is within the scope of the invention to associate such means for acceleration in a pulsing manner with a bearing of the pendulum. The pendulum can very quickly pivot into a vertically aligned position as a result of the acceleration of the pendulum and/or the pendulum bearing in a pulsing manner. The provision of means for accelerating the pendulum and/or the pendulum bearing in a pulsing manner makes it additionally possible to configure the, preferably rigid, pendulum comparatively short and to nevertheless assure an exact, perpendicular alignment capability of the pendulum. An embodiment is particularly preferred, wherein a rigid pendulum carrying at least one light source, preferably an end section of said pendulum, is mounted in a pendulum receptacle (pendulum bearing), the pendulum receptacle resting against the pendulum in a frictionally engaging manner. By an acceleration of the pendulum in a pulsing manner and/or an acceleration of the pendulum receptacle in a pulsing manner, the pendulum is moved in a pulsing manner relative to the pendulum receptacle and thereby vertically aligns itself until it is situated in its position of center of gravity. An additional advantage of a marking and/or leveling device configured according to the concept of the invention in addition to a low overall height and a fast pendulum damping is the simple and robust construction, which guarantees a long service life of the marking and/or leveling device.

In a surprisingly simple embodiment of the means for accelerating the pendulum in a pulsing manner, the means comprise a vibrating device having an eccentric which can be driven by an electrical motor. In other words, the means for accelerating the pendulum and/or the pendulum bearing comprise a (small) motor, which absorbs an unbalance. This unbalance on account of its mass inertia ensures that the pendulum and/or the pendulum bearing vibrate(s). Alternatively, it is conceivable to excite the pendulum and/or the pendulum bearing in a pulsing manner into vibration with the aid of, in particular low frequency, sound waves.

According to a further alternative embodiment, the means for accelerating the pendulum and/or the pendulum bearing in a pulsing manner comprise at least one air jet device, with whose help pulsed air streams can be produced. In so doing, an embodiment can be implemented, wherein a pulsed air stream is generated, which is directed at the pendulum and/or a pendulum bearing. Additionally or alternatively, it is conceivable for the pendulum to be mounted by means of an air gap of variable width relative to the housing of the marking and/or leveling device. By means of a, in particular quick, change in the extent of the width of the bearing gap, i.e. of the air cushion, particularly by varying the air pressure and/or the volume flow, the pendulum is accelerated in a pulsing manner and thereby vertically aligns itself.

According to a further alternative embodiment, the means for accelerating the, in particular rigid, pendulum and/or the pendulum bearing comprise a magnet device, with which pulsed magnetic forces acting on the pendulum bearing and/or the pendulum can be produced. An embodiment is particularly preferable, wherein the pendulum is magnetically mounted relative to the housing of the marking and/or leveling device. In so doing, the magnetic bearing force changes in a pulsing manner, and the pendulum can thereby be excited to vibrate.

An embodiment is preferred, wherein a brake mechanism is associated with the pendulum. The pendulum can be fixed relative to the housing preferably in a frictionally engaging manner by means of said brake mechanism particularly after said pendulum has been vertically aligned with the aid of the means for acceleration in a pulsing manner.

There are different options with regard to the configuration of the brake mechanism. According to a first alternative, the brake mechanism permanently interacts with the pendulum, such that a relative motion between the pendulum and said brake mechanism is strictly brought about by the acceleration of the pendulum and/or the pendulum bearing in a pulsing manner, said brake mechanism effecting a slowing down on the pendulum during the pulse intervals. It is thereby particularly preferred if said brake mechanism simultaneously forms a, particularly the only, bearing receptacle for the pendulum.

According to a second alternative, the brake mechanism comprises at least one (brake) element, which is actively movable relative to the pendulum between a release position and a braking position. In doing so, said element is connected in the braking position to the pendulum in a positive-locking manner or preferably in a frictionally engaging manner, respectively lies against said pendulum.

In the event that the brake mechanism is equipped with an actively movable (brake) element, provision is advantageously made in a modification to the invention for said element to be automatically pivoted into the release position during or before the activation of the means for accelerating the pendulum and/or the pendulum bearing in a pulsing manner. Alternatively, a manual adjustment of said element between the release position and the braking position can be implemented.

Provision is made according to an advantageous embodiment for the actively movable element of the brake mechanism to lie against the pendulum, preferably against a ball head of the pendulum, in a frictionally engaging manner. In the event that the element is configured as a non-movable (passive) brake element, said element can form the bearing mount for the pendulum. In this case, a ring-shaped configuration of said element is preferred. The ring thereby lies against a preferably (partially) ball head-shaped end or section of the pendulum, and said pendulum is movable relative to said pendulum by vibrating said element, respectively said pendulum.

BRIEF DESCRIPTION OF THE FIGURES

Additional advantages, characteristics and details of the invention arise from the following description of preferred embodiments as well as with the aid of the drawings. These show in.

DETAILED DESCRIPTION

Figure 1:
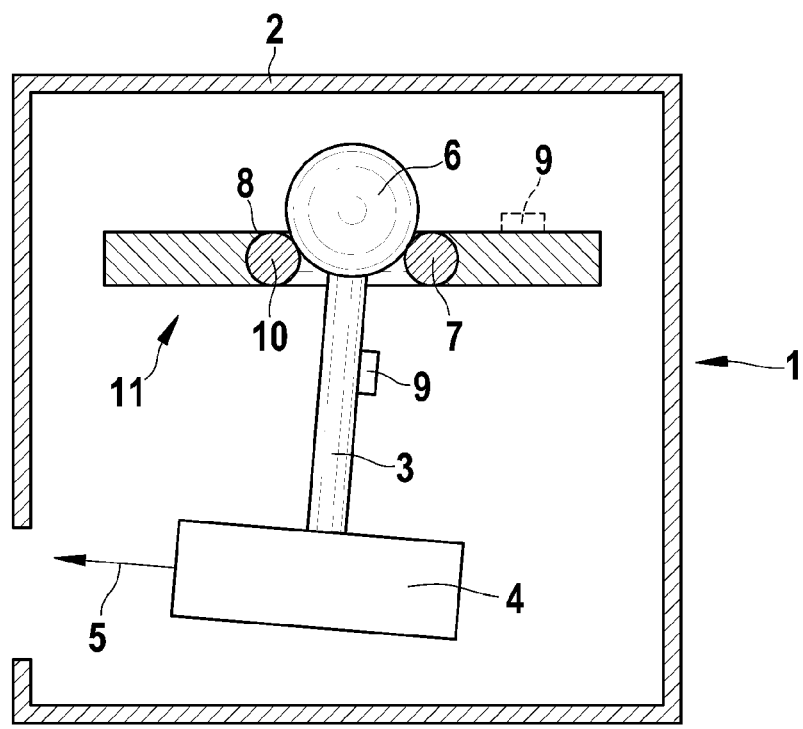
FIG. 1: a schematic depiction of a marking and/or leveling device with a passive brake mechanism.

In the figures, the same components and components having the same function are labeled with the same reference numerals.

In FIG. 1 a marking and/or leveling device 1 is shown in a schematic depiction. Said device comprises a housing 2 as well as a pendulum 3, which is mounted relative to said housing 2 so as to be pivotable in all spatial directions relative to said housing 2. The pendulum 3 is configured as a rigid rod element and carries a light source 4, which is configured as a laser diode, for producing a laser beam 5, which is linear or punctiform in cross section, on its lower end in the drawing plane. Punctiform, respectively linear, leveled laser lines can be projected onto a plane of projection with said laser beam 5.

The rigid pendulum 3 has a ball head 6, which together with a ring-shaped bearing receptacle 7 forms a pendulum bearing 8, on its upper end in the drawing plane, which is opposite the light source 4. The bearing receptacle 7 is fixedly connected to the housing 2 and is traversed downwards in the drawing plane by the pendulum 3. In other words, the ball head 6 rests on the bearing receptacle 7.

In FIG. 1, the pendulum 3 is situated in a non-aligned position that deviates from the perpendicular. In order to perpendicularly align the pendulum 3, only schematically depicted means 9 for accelerating the pendulum 3 in a pulsing manner are provided. In the example of embodiment shown, the means 9 are directly disposed on the pendulum 3. Additionally or alternatively, a disposal of the means 9 on the light source 4 or on the bearing receptacle 7, i.e. on the pendulum bearing 8 can be implemented (cf. means 9 delineated with dotted lines). It is also conceivable that all of the previously stated parts are equipped with separate means 9 for acceleration in a pulsing manner. In a simplest case, the means 9 for accelerating the pendulum 3 in a pulsing manner are configured as an electric motor. If the means 9 for accelerating the pendulum 3 in a pulsing manner are activated, said pendulum 3 is vibrated and moved relative to the bearing receptacle 7 and the housing 2 in a pulsing manner, whereby the pendulum 3 with the light source 4 assumes its position of center of gravity. The pendulum is therefore aligned such that the light source 4 applies leveled markings onto the projection plane.

In the example of embodiment depicted in FIG. 1, the bearing receptacle 7 of the pendulum bearing simultaneously forms a non-movable element 10 of a (passive) brake mechanism 11. A quick slowing down of the pendulum 3 is effected by the frictionally engaging connection between the ball head 6 and the element 10 (bearing receptacle 7) in the pulse intervals so that the stabilization time for perpendicularly aligning the pendulum 3 is short.

Figure 2:
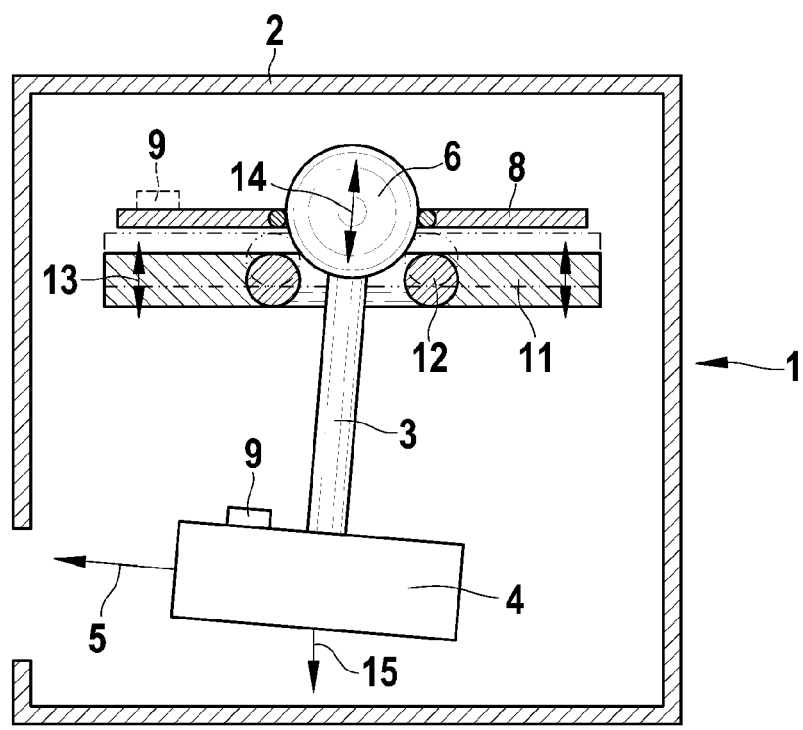
FIG. 2: the marking and/or leveling device according to FIG. 1 with a brake mechanism having an actively movable element.

In addition to a pendulum bearing 8, a brake mechanism 11, which is separate therefrom, is provided in the example of embodiment according to FIG. 2. Said mechanism 11 comprises a (brake) element 12, which can be actively, manually or automatically moved relative to the ball head 6 of the pendulum 3. Said brake element 12 can be moved between the depicted release position and a braking position, in which the element 12 rests against the ball head 6 in a frictionally engaging manner in the directions of the arrows 13. By moving the movable element 12 into the release position shown, the means 9 for accelerating the pendulum 3 in a pulsing manner are automatically activated so that said pendulum 3 is vibrated and rotates in the pendulum bearing 8 relative to the housing 2. The vibration of the pendulum 3, which is brought about by the means 9 for acceleration in a pulsing manner, is symbolized by the arrows 14. Due to the vibrational movement of the pendulum 3, the bearing friction of the pendulum bearing 8 is overcome and the restoring force 15 due to gravity is sufficient to perpendicularly align said pendulum 3, whereby a horizontally aligned and/or a vertically aligned light marking can be projected from the light source 4 onto the undepicted plane of projection by means of the light beam 5. The means 9 can be additionally or alternatively disposed on the pendulum bearing 8 (cf. means 9 delineated with dotted lines).

The marking and/or leveling devices 1 shown in FIGS. 1 and 2 are extremely robustly configured with respect to the marking and level devices known from the technical field. Moreover, the pendulum 3 is in comparison short, whereby the entire marking and/or leveling device 1 is comparatively low in design.

The invention claimed is:

1. Marking or leveling device comprising:
   a housing;
   a pendulum that is mounted relative to the housing, wherein the pendulum is pivotable in at least one spatial direction relative to the housing,
   a light source disposed on the pendulum; and
   means for pulse-like acceleration of the pendulum or a pendulum mount.

2. Device according to claim 1, wherein
   in that the means have a vibrating device with an eccentric, which can be driven by an electric motor.

3. Device according to claim 1, wherein
   in that the means have an air jet device for producing pulsed air streams.

4. Device according to claim 1, wherein
in that the means have a magnet device for producing pulsed magnetic forces.

5. Device according to claim 1, wherein
in that the means are disposed directly on the pendulum.

6. Device according to claim 1, wherein in that a brake mechanism is associated with the pendulum.

7. Device according to claim 6 wherein,
in that the pendulum can be moved relative to the brake mechanism strictly by the acceleration in a pulsing manner.

8. Device according to claim 6, wherein, in that the brake mechanism has an element, which is actively movable relative to the pendulum between a release position and a braking position.

9. Device according to claim 8, wherein
in that the element can be automatically pivoted into the release position during or before the activation of the means for accelerating the pendulum in a pulsing manner.

10. Device according to claim 8, wherein
in that the element rests in the braking position against the pendulum, preferably against a ball head of the pendulum, in a frictionally engaging manner.

* * * * *